United States Patent [19]
Araki

[11] Patent Number: 5,777,772
[45] Date of Patent: Jul. 7, 1998

[54] OPTICAL TRANSMITTER

[75] Inventor: Soichiro Araki, Tokyo, Japan

[73] Assignee: NEC Corporation, Tokyo, Japan

[21] Appl. No.: 633,298

[22] Filed: Apr. 17, 1996

[30] Foreign Application Priority Data

Apr. 21, 1995 [JP] Japan .................................. 6-120756

[51] Int. Cl.$^6$ ..................................................... H04B 10/04
[52] U.S. Cl. ............................................. 359/180; 359/165
[58] Field of Search ................................. 359/133, 180, 359/165

[56] References Cited

U.S. PATENT DOCUMENTS

| | | | |
|---|---|---|---|
| 4,531,217 | 7/1985 | Kitamura | 372/50 |
| 5,138,475 | 8/1992 | Bergmann et al. | 359/113 |
| 5,175,641 | 12/1992 | Boerstler et al. | 359/180 |
| 5,274,396 | 12/1993 | Shimoda et al. | 346/107 R |
| 5,446,572 | 8/1995 | Husbands et al. | 359/133 |
| 5,548,435 | 8/1996 | Takara et al. | 359/180 |
| 5,644,653 | 7/1997 | Sunakawa et al. | 382/187 |

*Primary Examiner*—Leslie Pascal
*Attorney, Agent, or Firm*—Laff, Whitesel, Conte & Saret, Ltd.

[57] ABSTRACT

In an optical transmitter for optical communication, optical interconnection and so forth, one laser diode diode (LD) for emitting an optical signal is selected out of an array of LDs in response to address signals. This prevents the other or unselected LDs from consuming power and thereby obviates an increase in power consumption ascribable to an increase in the number of channels.

8 Claims, 7 Drawing Sheets

OPTICAL TRANSMITTER

BACKGROUND OF THE INVENTION

The present invention relates to an optical transmitter for optical communication, optical connection and so forth and, more particularly, to an optical transmitter capable of selecting at least one laser diode (LD) out of a multichannel LD array and driving it.

A conventional optical transmitter has a plurality of optical transmission circuits. Each transmission circuit is made up of an LD and an LD drive circuit. The LD transforms an electric signal to an optical signal by varying its emission in accordance with a drive current. The LD drive circuit converts an electric signal to the drive current for driving the LD. The transmitter is capable of transmitting spatially parallel data without multiplexing them with respect to time or wavelength. It is therefore possible to transmit a great amount of data without resorting to special wavelength control.

However, the above conventional transmitter having a plurality of transmission circuits is not satisfactory in the following respects. Assume an address selection type optical transmitter having an LD array made up of a plurality of parallel LDs each of which is assigned to a particular destination, and selecting at least one of the LDs or destinations. Then, because the conventional transmitter lacks a control circuit, it cannot select one of the LDs each constituting a respective channel. Further, assume a variable wavelength type optical transmitter which includes an array of LDs each having a particular emission wavelength and selects one of them so as to vary the wavelength. The conventional transmitter cannot implement this type of transmitter either, because it lacks a control circuit.

Moreover, because the transmitter constantly applies a bias current the LD array, noise is generated due to the DC emissions of unselected LDs. In addition, a current must be constantly fed to the differential amplifier of the LD drive circuit even when modulation is not effected. This, coupled with the bias current, noticeably increases power consumption as the number of channels is increased.

Japanese Patent Laid-Open Publication No. 6-216847, for example, discloses a dual optical transmitter having an active and a standby transmission circuit. Light output from the active circuit and light output from the standby circuit are individually split, then combined, and then transferred to an optical fiber. When an LD included in the active circuit is deteriorated, its output is automatically replaced with the output of the standby circuit so as to reduce the duration of the circuit fault. However, this kind of scheme is not adaptive to two or more channels.

SUMMARY OF THE INVENTION

It is therefore an object of the present invention to provide an optical transmitter capable of selecting any particular address of an LD array and reducing power consumption.

In accordance with the present invention, an optical transmitter has a plurality of LDs, a plurality of drive circuits each for driving the respective LD, and a channel select circuit for transferring at least one of two input signals to one of the plurality of drive circuits which is selected by address signals.

Also, in accordance with the present invention, an optical transmitter has a plurality of LDs, a current source, and a channel select circuit connected between the plurality of LDs and the current source. The channel select circuit has a plurality of differential amplifiers connected in a binary tree configuration from the current source toward the plurality of LDs. Data signals are input to the input terminals of the differential amplifies located at one end adjoining the current source. Address signals are input to the input terminals of the differential amplifiers located at the other end adjoining the plurality of LDs.

BRIEF DESCRIPTION OF THE DRAWINGS

The above and other objects, features and advantages of the present invention will become more apparent from the following detailed description taken with the accompanying drawings in which.

In the figures, the same or similar constituent parts are designated by like reference numerals.

DESCRIPTION OF THE PREFERRED EMBODIMENTS

Figure 1A:
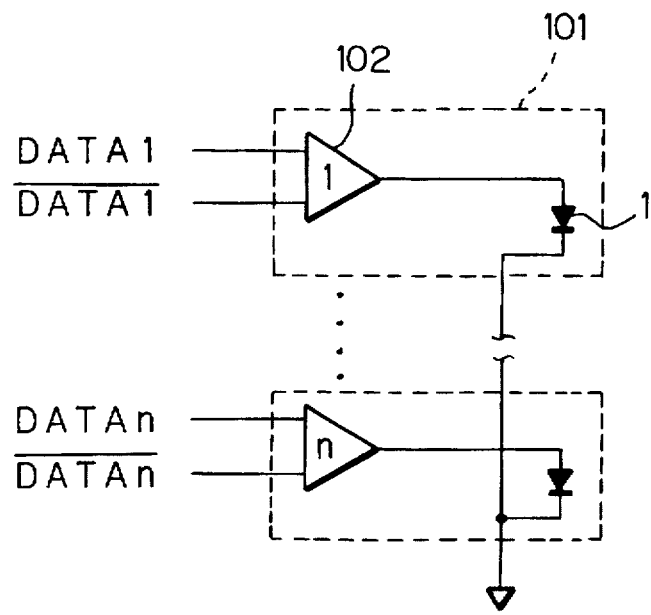
FIGS. 1A and 1B are circuit diagrams showing a conventional optical transmitter.

To better understand the present invention, a brief reference will be made to a conventional optical transmitter, shown in FIGS. 1A and 1B. As shown in FIG. 1A, the transmitter has a plurality (n) of optical transmission circuits 101. Voltage signals DATA1–DATAn and their inverted signals $\overline{DATA1}$–$\overline{DATAn}$ are respectively applied to the transmission circuits 101 in pairs, as illustrated. Each transmission circuit 101 is made up of an LD 1 and an LD drive circuit 102. The LD 1 transforms an electric signal to an optical signal by varying its emission in accordance with a drive current. The LD drive circuit 102 converts an electric signal to the drive current for driving the LD 1.

Figure 1B:
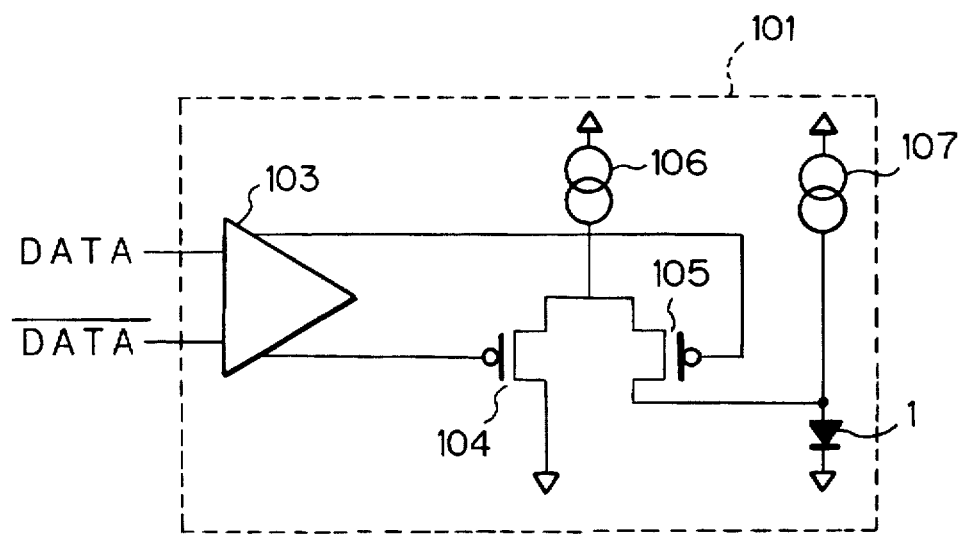

FIG. 1B shows the LD drive circuit 102 in detail. As shown, the circuit 102 has a differential amplifier implemented by MOSFETs (Metal Oxide Semiconductor Field Effect Transistors) 104 and 105 and a first current source 106. The MOSFETs 104 and 105 constitute a differential pair. The input voltage signals DATA1 and $\overline{DATA1}$, for example, are applied to the differential amplifier via a buffer amplifier 103 and transformed to an LD modulating current signal thereby. This current signal is applied to the LD 1. The amplitude of the current signal is adjustable on the basis of the current value of the first current source 106. A second current source 107 is also connected to the LD 1 in order to determine the bias state of the LD 1.

The above transmitter is capable of transmitting spatially parallel data without multiplexing them with respect to time or wavelength, as stated earlier. It is therefore possible to transmit a great amount of data without resorting to special wavelength control. However, the conventional transmitter has some problems left unsolved, as follows.

Figure 2:
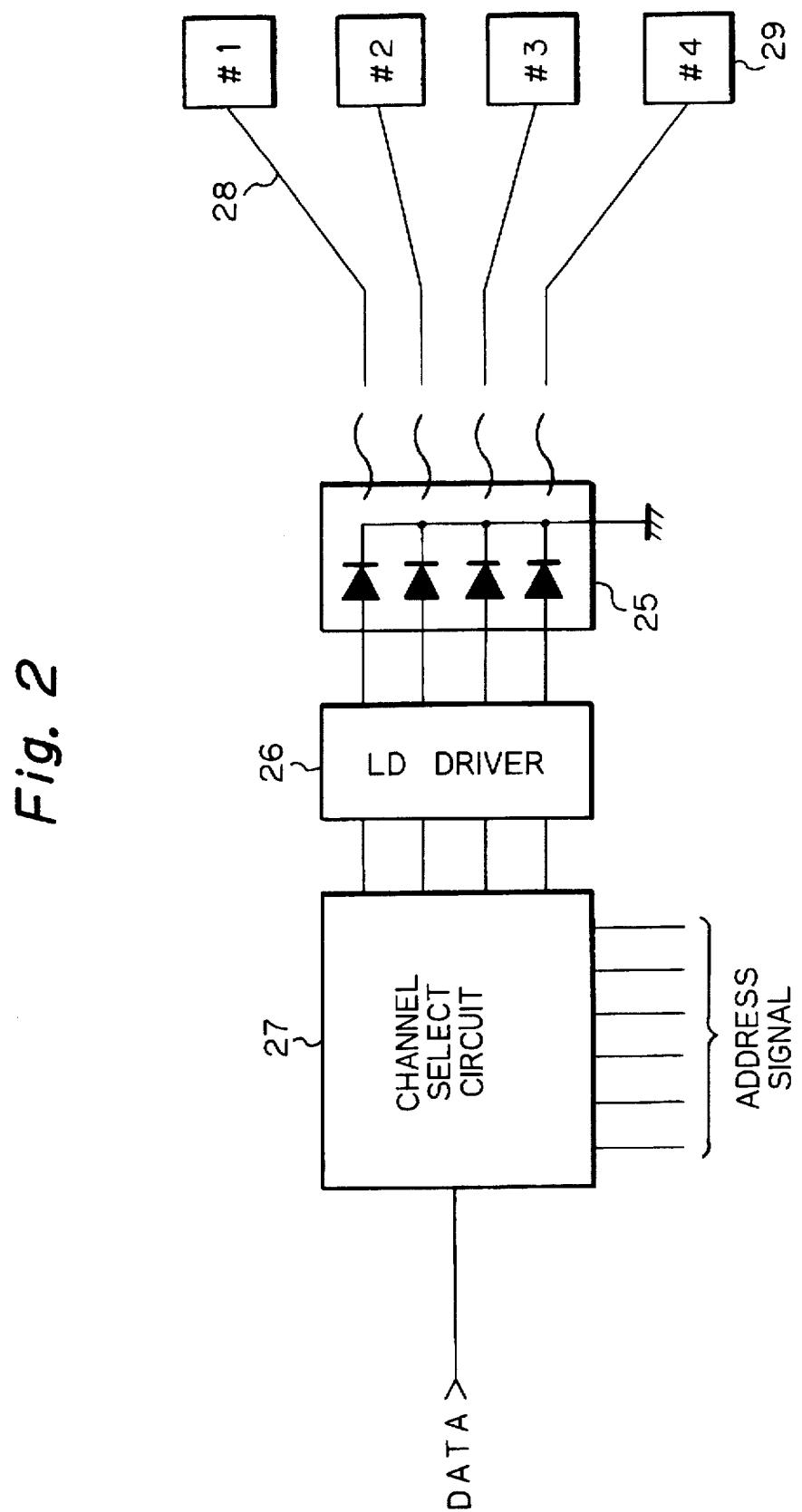
FIG. 2 is a block diagram schematically showing a specific address selection type optical transmitter to which the present invention is applicable.
Figure 3:
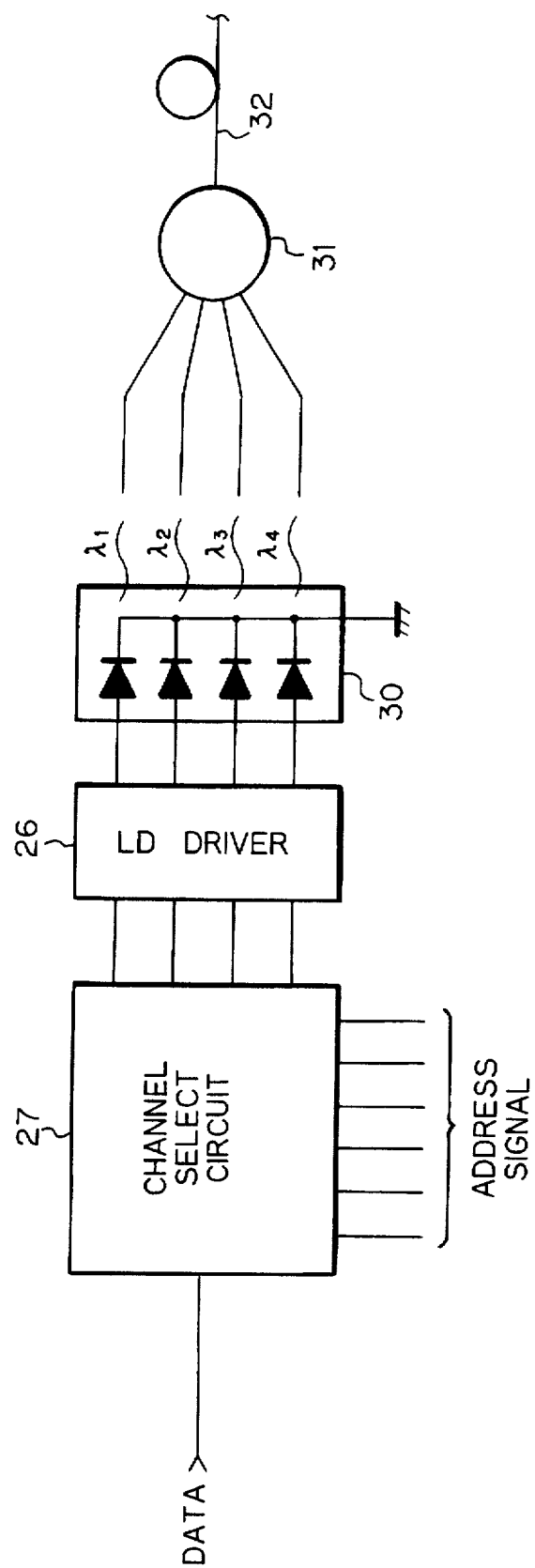
FIG. 3 is a block diagram schematically showing a specific variable wavelength type optical transmitter to which the present invention is also applicable.

As shown in FIG. 2, assume an address selection type optical transmitter having an LD array 25 made up of a plurality of parallel LDs each of which is assigned to a particular destination, and selecting at least one of the LDs or destinations. Then, because the conventional transmitter lacks a control circuit, it cannot select one of the LDs each constituting a respective channel. As shown in FIG. 2, assume a variable wavelength type optical transmitter which includes an array of LDs 30 respectively having emission wavelengths λ1–λ4 and selects one of them so as to vary the wavelength. The conventional transmitter cannot implement this type of transmitter either, because it lacks a control circuit. Further, a problem with the circuitry of FIG. 3 is that because a bias current is constantly applied to the LD array 30, noise is generated due to the DC emissions of unselected LDs. In addition, a current must be constantly fed to the differential amplifier even when modulation is not effected. This, coupled with the bias current, noticeably increases power consumption as the number of channels is increased.

In FIGS. 2 and 3, there are also shown an LD drive circuit 26, a channel select circuit 27, optical fibers 28, an optical receiver 31, and an optical fiber 32.

Figure 4:
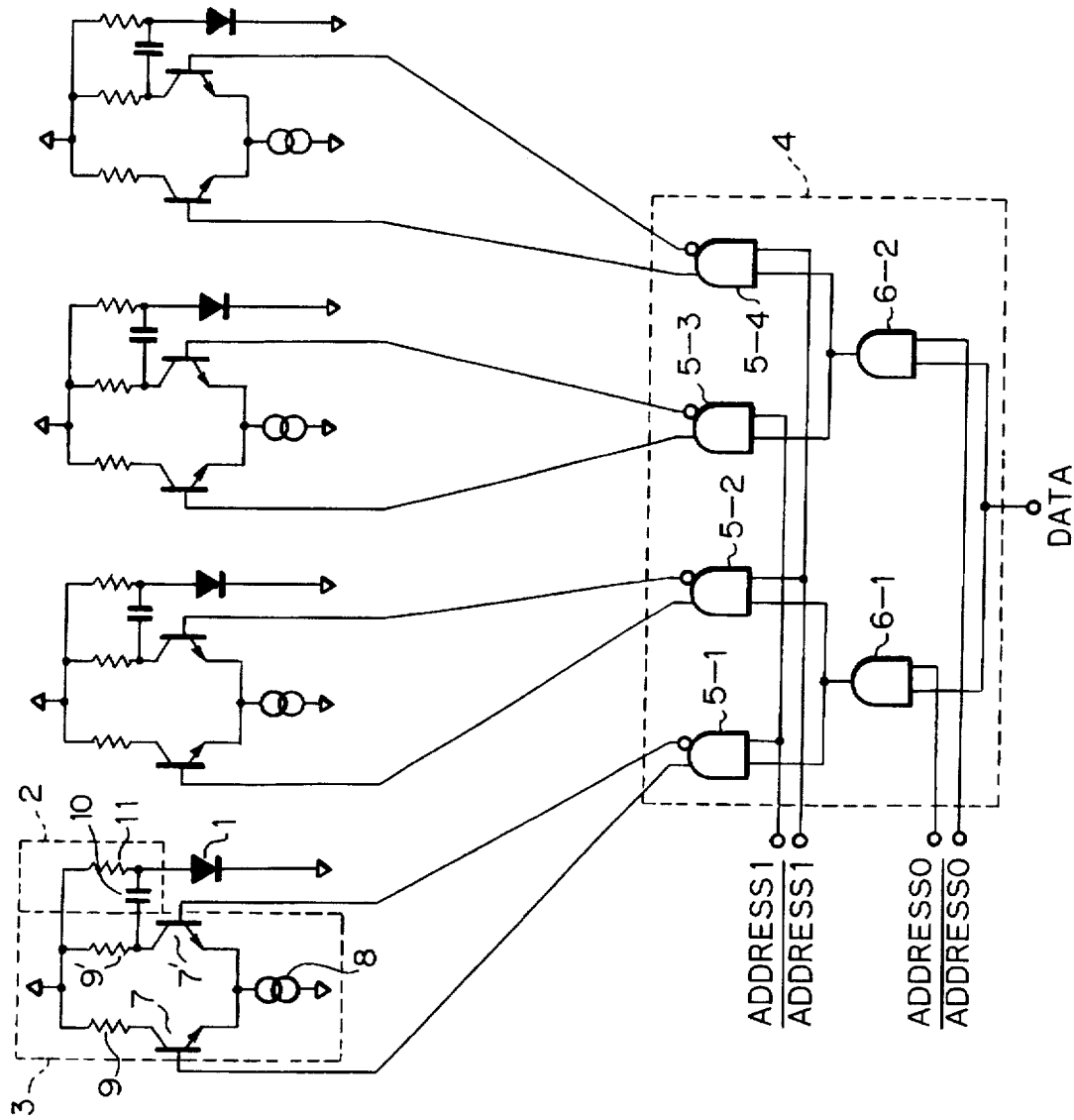
FIGS. 4–7 are block diagrams respectively showing a first embodiment to a fourth embodiment of the optical transmitter in accordance with the present invention.

Referring to FIG. 4, an optical transmitter embodying the present invention is shown. As shown, the transmitter has a plurality of LDs 1. Bias circuits 2 and LD drive circuits 3 are associated with each LD 1. The reference numeral 4 designates a channel select circuit. As shown in FIG. 4 specifically, the bias circuit 2 has a resistor 11 for controlling a DC bias current, and a capacitance 10 via which a modulating signal is applied to the LD 1. In the illustrative embodiment, the LD drive circuit 3 has n-p-n bipolar transistors 7 and 7' constituting a differential pair, a current source 8 connected to the emitters of the transistors 7 and 7' which are connected to each other, and resistors 9 and 9' respectively connected to the collectors of the transistors 7 and 7'.

The channel select circuit 4 has AND gates 5-1 to 5-4, 6-1 and 6-2. An input data signal DATA is split into two and connected to the AND gates 6-1 and 6-2 each having two inputs and one output. An address signal ADDRESS0 and its inverted address signal $\overline{ADDRESS0}$ are input to the AND gates 6-1 and 6-2, respectively. The AND gates 6-1 and 6-2 each determines whether or not to output the data signal DATA on the basis of the logical level (high or low) of the input address signal ADDRESS0 or $\overline{ADDRESS0}$. By stacking n channel select circuits 4 each having the AND gates 6-1 and 6-2 in a binary tree configuration, it is possible to select one of $2^n$ LDs 1. The AND gates 5-1 to 5-4 constituting the last stage of the channel select circuit 4 are of differential output type because the LD drive circuit 3 is of differential input type.

Figure 5:
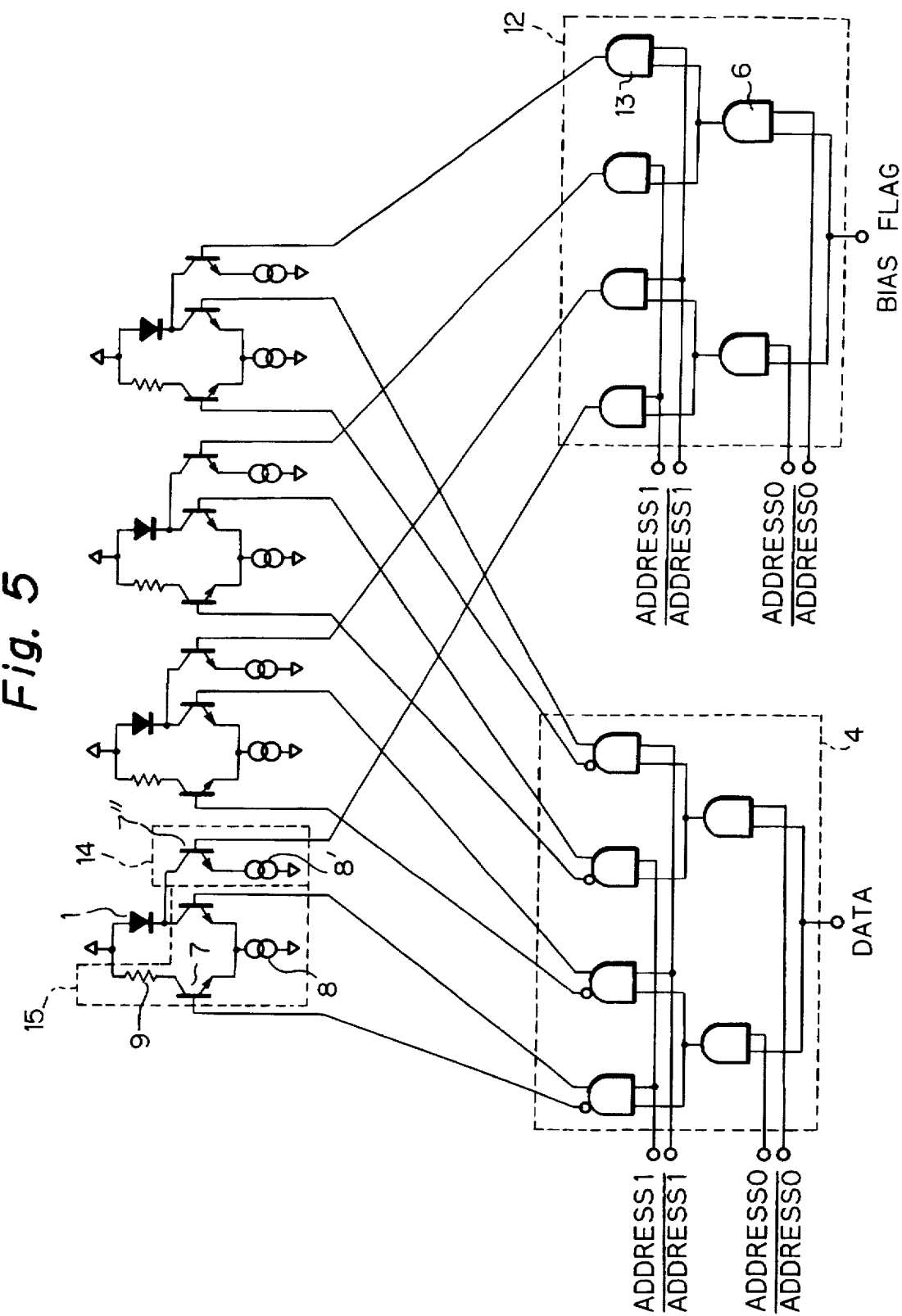
Figure 6:
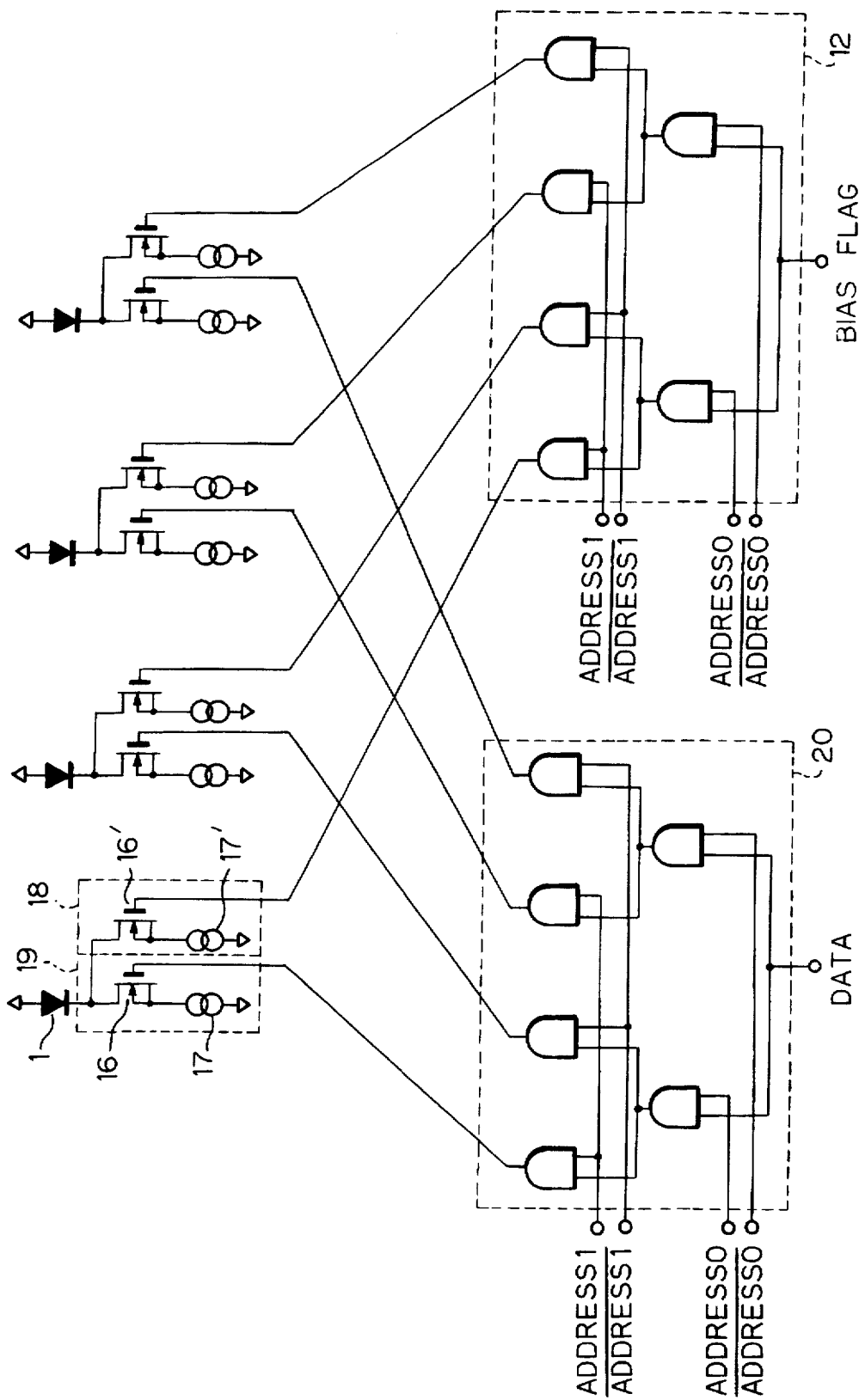

FIG. 5 shows another embodiment of the present invention. As shown, a bias control circuit 14 and an LD drive circuit 15 are associated with each of the LDs 1. The bias control circuit 14 is capable varying the bias state in response to a control signal input from the outside. There are also shown in FIG. 6 a channel select circuit 4 and a bias channel select circuit 12.

The bias select circuit 12 is identical in configuration with the channel select circuit 4 except that AND gates 13 constituting its last stage have a single output each, i.e., they are not of differential output type. The bias control circuit 14 is made up of a current source 8' and a transistor 7". The circuit 14 is capable of varying a bias, depending on whether or not a control signal is input to the base of the transistor 7". In this configuration, only if the address signals applied to the channel select circuit 4 are also applied to the bias channel select circuit 12, the LD 1 to which a data signal current is input and the LD 1 to which a bias current is input coincide, allowing data to be transmitted.

In the illustrative embodiment, the transistors 7' of the bias control circuits 14 on the channels not selected by the address signals are not turned on, so that no currents flow through such channels. Therefore, power consumption is prevented from increasing with an increase in the number of channels.

Further, a bias flag is input to a bias flag terminal included in the bias channel select circuit 12. By controlling the logical level (high or low) of the bias flag, it is possible to selectively enable or disenable the entire transmitter as to transmission. For example, when an error occurs in the transmitter, the bias flag may be caused to go low so as to inhibit the entire transmitter from operating.

FIG. 6 shows still another embodiment of the present invention. As shown, a bias control circuit 18 and an LD drive circuit 19 are associated with each LD 1. The bias control circuit 18 operates in the same manner as the circuit 14, FIG. 5. There are also shown in FIG. 6 a channel select circuit 12 and the bias channel select circuit 12.

The LD drive circuit 19 is implemented as a single-end LD drive circuit having a current source 17 and an n-channel transistor (FET) 16. The transistor 16 has its gate connected to the output of the associated AND gate included in the output stage of the channel select circuit 20. The drain and source of the transistor 16 are respectively connected to the cathode terminal of the LD1 and current source 17. The bias control circuit 18 is also implemented as a single-end circuit having a current source 17' and an n-channel transistor 16'. The transistor 16' has its gate connected to the output of the associated AND gate included in the output stage of the bias channel select circuit 12. The drain and source of the transistor 16' are respectively connected to the cathode terminal of the LD 1 and current source 17'.

In this embodiment, no currents flow through the LD drive circuit 19 when modulation is not effected, because the circuit 19 is of single-end type. Therefore, the LD drive circuits associated with the unselected LDs do not consume any power. This, coupled with the function of the bias control circuits, further reduces power consumption.

Figure 7:
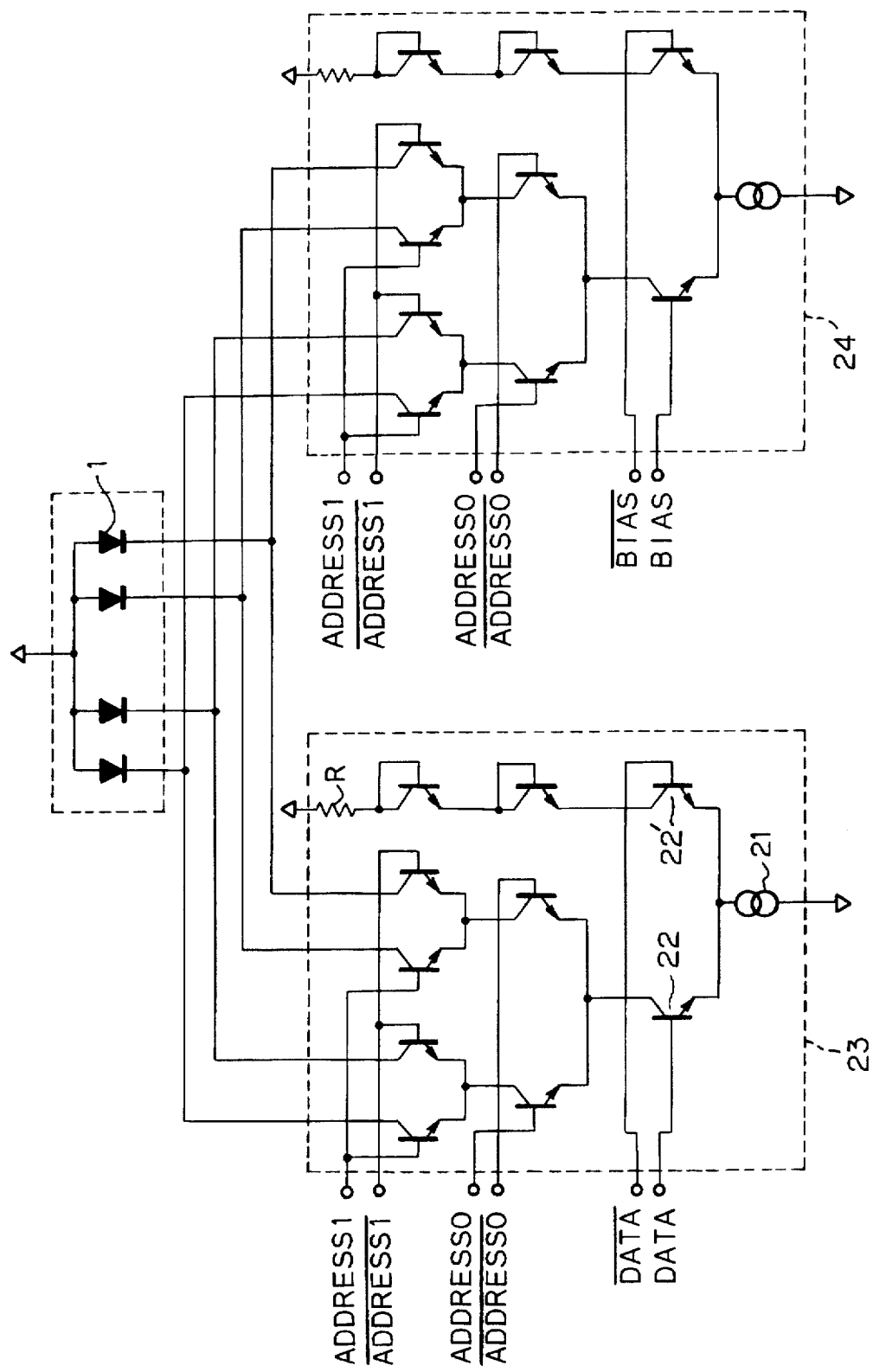

FIG. 7 shows a further embodiment of the present invention. As shown, this embodiment has LDs 1, a channel select and LD drive circuit 23, and a channel select and LD bias circuit 24. The two circuits 23 and 24 each has differential amplifiers connected in a binary tree configuration.

In the channel select and LD drive circuit 23, transistors 22 and 22' constituting a differential pair are connected to a current source 21. Differential data signals DATA and $\overline{DATA}$ are respectively connected to the bases of the transistors 22 and 22'. A series connection of a resistor R and two transistors (each having its collector and base connected together) intervenes between the collector of the transistor 22' and a power source. This series connection is used to adjust the balance between the transistors 22 and 22'. Differential address signals are applied to the bases of each pair of transistors which are connected in a binary tree configuration from the current source 21 toward the LDs 1. Specifically, two differential amplifier belonging to the same layer respectively receive an address signal (e.g. ADDRESS0) and its inverted signal (ADDRESS0) which are representative of the same bit. When all the transistors positioned on the path extending from one LD 1 of the LD array to the current source 21 are turned on in accordance with the address signals, a current flows through the above LD 1 and causes it to emit. When the address signals are fixed, the differential transistor pairs other than the pair constituting a given path are all turned off. In this condition, a current flows through the LD 1 connected to the above path in accordance with the data signal, causing the LD 1 to emit.

The channel select and LD bias circuit 24 operates in the same manner as the channel select and LD drive circuit 23. Input bias signals BIAS and BIAS are capable of determining the bias state of the LD 1 which is turned on.

With the above construction, this embodiment is capable of dealing not only with digital data signals and digital bias signals but also with analog data signals and analog bias signals.

In summary, it will be seen that the present invention provides an optical transmitter capable of selecting, in response to address signals, one LD to emit an optical signal out of an array of LDs. This prevents the other or unselected LDs from consuming power and thereby obviates an increase in power consumption ascribable to an increase in the number of channels.

Further, the optical transmitter includes a channel select circuit so constructed as to select an LD to which a bias current should be input, while selecting a signal output path. This further reduces power consumption.

In the transmitter of the present invention, the select circuit has differential amplifiers connected in a binary tree configuration. Therefore, if the differential amplifiers are arranged in n consecutive layers, then one LD can be selected out of an array of $2^n$ LDs. It follows that a multichannel address selection type transmitter is achievable which saves power despite an increase in the number of channels.

In addition, the transmitter includes an LD drive circuit of single-end type which allows no currents to flow therethrough when modulation is not effected. Therefore, the LD drive circuits associated with unselected LDs consume no power. This further reduces the power consumption of the transmitter.

Various modifications will become possible for those skilled in the art after receiving the teachings of the present disclosure without departing from the scope thereof. For example, the binary tree type select circuit shown and described may be replaced with a select circuit having any other suitable tree configuration. While the embodiments may be implemented by discrete elements, they are feasible for integrated circuitry.

What is claimed is:

1. An optical transmitter comprising:

a plurality of LDs;

a current source; and a channel select circuit connected between said plurality of LDs and said current source and comprising a plurality of differential amplifiers connected in a binary tree configuration from said current source toward said plurality of LDs, wherein data signals are input to input terminals of the differential amplifiers located at one end adjoining said current source, and wherein address signals are input to input terminals of the differential amplifiers, said binary tree configuration being connected from the differential amplifiers adjoining said current source toward said plurality of LDs.

2. An optical transmitter as claimed in claim 1, wherein said differential amplifiers connected from the differential amplifiers adjoining said current source toward said plurality of LDs include a plurality of layers of said differential amplifiers, the differential amplifiers lying in a same layer respectively receiving an address signal and an inverted address signal corresponding in bit to each other.

3. An optical transmitter as claimed in claim 1, wherein while selecting an output path for the input signal, said channel select signal selects one of said plurality of LDs to which a bias current should be input.

4. An optical transmitter as claimed in claim 3, wherein the bias current is selectively applied to said one LD in accordance with a value of a switching signal.

5. An optical transmitter comprising:

a plurality of LDs;

a plurality of LD drivers, each of said LD drivers driving a respective one of said plurality of LDs; and a channel select circuit connected between said plurality of LD drivers and an input port and comprising a plurality of logical gates connected in a binary tree configuration, said binary tree extending from said input port toward said plurality of LD drivers, wherein data signals are input to one input terminal of each of the logical gates connected from the logical gates adjoining said input port toward said plurality of LD drivers.

6. An optical transmitter as claimed in claim 5, wherein said logical gates are connected from the logical gates adjoining said input port toward said plurality of LD drivers, said logic gates being arranged in layers in order to form said binary tree, the logical gates lying in a same layer respectively receiving an address signal and an inverted address signal corresponding in bit to each other.

7. An optical transmitter as claimed in claim 5, wherein while selecting an output path for the input signal, said channel selects one of said plurality of LDs to which a bias current should be input.

8. An optical transmitter as claimed in claim 7, wherein the bias current is selectively applied to said one LD in accordance with a value of a switching signal.

* * * * *

UNITED STATES PATENT AND TRADEMARK OFFICE
CERTIFICATE OF CORRECTION

PATENT NO. : 5,777,772

DATED : July 7, 1998

INVENTOR(S) : Soichiro Araki

It is certified that error appears in the above-identified patent and that said Letters Patent is hereby corrected as shown below:

Title Page -- [30] Foreign Application Priority Data:
delete "6-120756" and insert --7-120756--

Signed and Sealed this

Third Day of November, 1998

BRUCE LEHMAN

*Attest:*

*Attesting Officer*  Commissioner of Patents and Trademarks